(12) United States Patent
Mittal et al.

(10) Patent No.: US 6,480,859 B2
(45) Date of Patent: *Nov. 12, 2002

(54) METHOD FOR MERGING MULTIPLE KNOWLEDGE BASES INTO ONE OPTIMIZED AND COMPRESSED KNOWLEDGE BASE

(75) Inventors: Sanjay Mittal, Fremont, CA (US); Shishirkumar Sharad Khedkar, Fremont, CA (US)

(73) Assignee: Selectica, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/770,938

(22) Filed: Jan. 25, 2001

(65) Prior Publication Data

US 2001/0007989 A1 Jul. 12, 2001

Related U.S. Application Data

(60) Division of application No. 09/037,398, filed on Mar. 9, 1998, now Pat. No. 6,205,446, which is a continuation-in-part of application No. 08/962,594, filed on Oct. 31, 1997, now Pat. No. 6,049,822.

(51) Int. Cl.$^7$ .............................................. G06F 17/30
(52) U.S. Cl. ........................ 707/101; 707/100; 707/103
(58) Field of Search ................................ 707/100, 101, 707/103

(56) References Cited

U.S. PATENT DOCUMENTS

| | | | | |
|---|---|---|---|---|
| 5,787,431 A | * | 7/1998 | Shaughnessy | 707/100 |
| 5,806,066 A | * | 9/1998 | Golshani et al. | 707/100 |
| 5,838,965 A | * | 11/1998 | Kavanagh et al. | 707/103 |
| 5,884,314 A | * | 3/1999 | Bulusu | 707/100 |
| 5,903,890 A | * | 5/1999 | Shoji | 707/3 |
| 6,205,446 B1 | * | 3/2001 | Mittal et al. | 707/101 |

OTHER PUBLICATIONS

Eick et al., Rule–Based Consistency Enforcement for Knowledge–Based Systems, IEEE Transactions on Knowledge and Data Engineering, vol. 5 issue 1, p. 52–64, Feb. 1993.*

* cited by examiner

*Primary Examiner*—Greta L. Robinson
(74) *Attorney, Agent, or Firm*—Donald R. Boys; Central Coast Patent Agency, Inc.

(57) ABSTRACT

A system for integrating multiple related knowledge base files into a single file keeping all of the parameters and constraints of the multiple files operates by identifying two or more common parameters among the files, and merging the two or more parameter statements into a single statement in the integrated file, the single statement listing all of the values of the several statements in the multiple files. Additional constraints are added to the new, smaller file to properly relate the values to a characteristic of the original files. The resulting single file is also optimized by combining value and activity constraints into single constraint statements. The resulting smaller file is more efficient for transfer and use in knowledge base systems of many sorts.

12 Claims, 4 Drawing Sheets

143 ─╮

| Sample Code for Parameter Merge |
|---|
| ModelA.kbs: <CxEnum "Feature1" {"F1-1", "F1-2", "F1-3"}[I] decs=""url=""extid=""> |
| ModelB.kbs: <CxEnum "Feature1" {"F1-1", "F1-2", "F1-3", "F1-4"}[I] decs=""url=""extid=""> |
| Merge result: <CxEnum "Feature1" {"F1-1", "F1-2", "F1-3", "F1-4"}[I] decs=""url=""extid=""> |
|    Parameter Name ─────┘ |
|    Value of Parameters ─────────── |
|       Constraint Application ─────────── |

| Sample Code for Table Constraints |
|---|
| <CxKeyTable[?"Feature1] name= "Model_Feature1 Table"> |
| ["A","F1-1"] |
| ["A","F1-2"] |
| ["A","F1-3"] |
| ["B","F1-1"] |
| ["B","F1-2"] |
| ["B","F1-3"] |
| ["B","F1-4"] |

*Fig. 3B*

Optimization of Rules

The following two rules are taken from composite.kbs:

<CxRule <CxMExp?"Model" = "A" name= "SubExpLhs0"><CxMExp ?"Feature1" = "F1-2" name= "SubExpLhs1"> Then<CxMExp ?"Feature2" = "F2-1" name= "SubExpRhs0"> name="A-F1-2=F2-1">

<CxRule <CxMExp?"Model" = "A" name= "SubExpLhs0"><CxMExp ?"Feature1" = "F1-2" name= "SubExpLhs1"> Then<CxMExp ?"Feature4" = "F4-1" name= "SubExpRhs0"> name="A-F1-2=F4-1">

In the Optimization Process these two rules become one:

<CxRule <CxMExp?"Model" = "A" name= "SubExpLhs0"><CxMExp ?"Feature1" = "F1-2" name= "SubExpLhs1"> Then<CxMExp ?"Feature2" = "F2-1" name= "SubExpRhs0"><CxMExp ?"Feature4" = "F4-1" name="SubExpRhs0"> name= "A-F1-2=F2-1">

METHOD FOR MERGING MULTIPLE KNOWLEDGE BASES INTO ONE OPTIMIZED AND COMPRESSED KNOWLEDGE BASE

CROSS-REFERENCE TO RELATED DOCUMENTS

The present application is a divisional of application Ser. No. 09/037,398, filed on Mar. 9, 1998 now U.S. Pat. No. 6,205,446, which is a continuation-in-part application from patent application Ser. No. 08/962,594 filed on Oct. 31, 1997 now U.S. Pat. No. 6,049,822. The prior application is incorporated herein by reference.

FIELD OF THE INVENTION

The present invention is in the field of computer-aided sales and marketing and has particular application to software tools for generating, merging, and optimizing Knowledge Bases.

BACKGROUND OF THE INVENTION

Computer-aided sales presentations wherein rules-based configurators are employed are valuable tools for allowing a customer or client to configure orders for products. This technique is employed in a network environment wherein a client configures his or her order and sends it over the Internet, or another type of network, to a seller which can fill the order. For example, a specific model of a product may have many different features, accessories, options, etc. With the appropriate application, a client can configure his or her own custom order for a particular model or type of product. By employing an interactive software method a client can apply certain desired features in his product-order configuration that were chosen from options provided by a seller.

More recently, it is known to the inventor that object-oriented, constraint-based configurators have begun to replace rules-based configurators by virtue of more flexible organization. For example, rules-based configurators rely on set rules that are programmed in a procedural computer language. Once the object models are complete they cannot be easily changed. Generally, programming is required to initiate revision to the product. However, with a knowledge-based configurator, the rules can be revised by editing the knowledge base itself. The knowledge base then applies the changes via automated linking to other elements of the process such as an object model. However, the object models are dependent on the language and platform used for implementation of the knowledge base. Generally programming is required to initiate revision to the product across several platforms and languages.

Generally speaking, an object model representing a product, such as a new automobile for example, is created using a programming language within a model-building application at the sellers end. This object model contains all of the descriptive elements and various features including cost information about the object it represents. A model writer procedure then writes a binary file, which is readable only to applications written in the same environment. These object models can then be presented to a client having the appropriate software application on the correct platform and using the required language. The client can then enter his desired choices or options via interactive software. A configurator commonly known as a run-time engine insures that the client's choices are applied correctly. The configurator is also adapted to negate any conflict or impossibility that may arise from the client's directives.

A difficulty with the current state of the art is that although a knowledge base is superior to a rules base as described above, the knowledge base is language-dependent and not easily transferred across different platforms (i.e. IBM to Macintosh, or even Win 3.1 vs. Win 95). For example, a client would be required to operate in the same computer platform and language to be able to interactively configure a desired purchase. This can severely hamper the seller's ability to reach a large portion of a target market.

The difficulty described in the immediately preceding paragraph has been successfully addressed by the inventor with reference to the prior co-pending patent application entitled "Method for Generating and Updating Knowledge-Based Configurators that are Multi Platform and Multi Language Capable". The incorporation of American Standard Code for Information Interchange (ASCII) files into the process as described in the prior patent application, incorporated herein by reference, allows the seller to transport human-readable ASCII files (flat files)) over a wide area network (WAN) such as the Internet to clients who may be operating different platforms and using different procedural languages, and the clients can then use the files.

It is well known in the art that certain seller-offered products such as automobiles, appliances, computers, and the like may be provided or presented in the form of a number of different models, with each model sharing certain commonalties and having certain differences from the others. In these instances, sellers may have to send several separate ASCII files to clients, for example, who know they want a basic type of product, but who are unsure of which exact model and what offered features within a model they want. Therefore, a problem arises both for the seller and the client in that the transportation of many ASCII files over a network requires significant bandwidth to deliver, significant memory to store, and considerable execution on the client side associated with loading various files to a configurator and executing the files.

Another significant advantage is that the user then can go through the selection and configuration process using the bottom-up approach, meaning that the configuration can start by selecting a feature as opposed to starting from the model. This allows for a free-form configuration process.

What is clearly needed is a method whereby several separate knowledge bases covering different versions of the same basic product can be merged and optimized so that one significantly more compact ASCII file may be sent to the client. Such a method would save transport time and associated cost, allow the client to load a single knowledge base into his configurator, and require less computer memory for the client to store files.

SUMMARY OF THE INVENTION

In a preferred embodiment of the present invention a method for integrating a first and a second knowledge base file into a single smaller integrated third file is provided, comprising steps of (a) loading at least portions of the two files to a software integrating engine; and (b) merging all instances of each unique parameter in the loaded portions of the first and second files into a single composite parameter in the integrated third file. The method may be further characterized, in situations wherein each of the two files represent a unique characteristic of a particular abstract entity, by a step for adding constraints to each single composite parameter in the third file, indicating which unique characteristic designates each value. Still another step may be added for merging all common value and activity constraints from the loaded portions of the first and second files into a single constraint by forming a single constraint with the common left-side term and creating a new right-side term from the multiple right-side terms for each common left-side term.

In some embodiments the two original files are loaded and integrated in their entirety. Also in some embodiments any number of files may be processed into a single, smaller file. An additional step may also be added for compressing the resulting single integrated file by conventional compression techniques, resulting in a still smaller final file.

The method taught is applicable to knowledge base files created for a wide variety of purposes, such as, for example, representing options and so forth for different models of a single brand of an automobile. Such files may be used with a graphical user interface (GUI) for allowing a potential customer or client to select options, colors, etc. for purchasing such an automobile.

In another aspect of the invention a software engine is provided, comprising modules for accomplishing the various steps above-described in the methods provided. It is convenient to prepare knowledge bases for different models and aspects of particular products and services, partly because, in some systems, not all of the resulting files will need be transferred to a potential customer. When it is known, however, which files (knowledge) a customer will need, it is also desirable to integrate the several files into a single smaller file before transfer, because this process results in quicker and less expensive transfer. An added benefit is that the customer will then have to load and deal with only the one file, rather than with several files.

BRIEF DESCRIPTION OF THE DRAWING FIGURES

FIG. 3A and FIG. 3B is a block diagram illustrating a parameter and constraint merging phase according to an embodiment of the present invention.

FIG. 4 is a block diagram illustrating an optimization phase according to an embodiment of the present invention.

DESCRIPTION OF THE PREFERRED EMBODIMENTS

Figure 1:
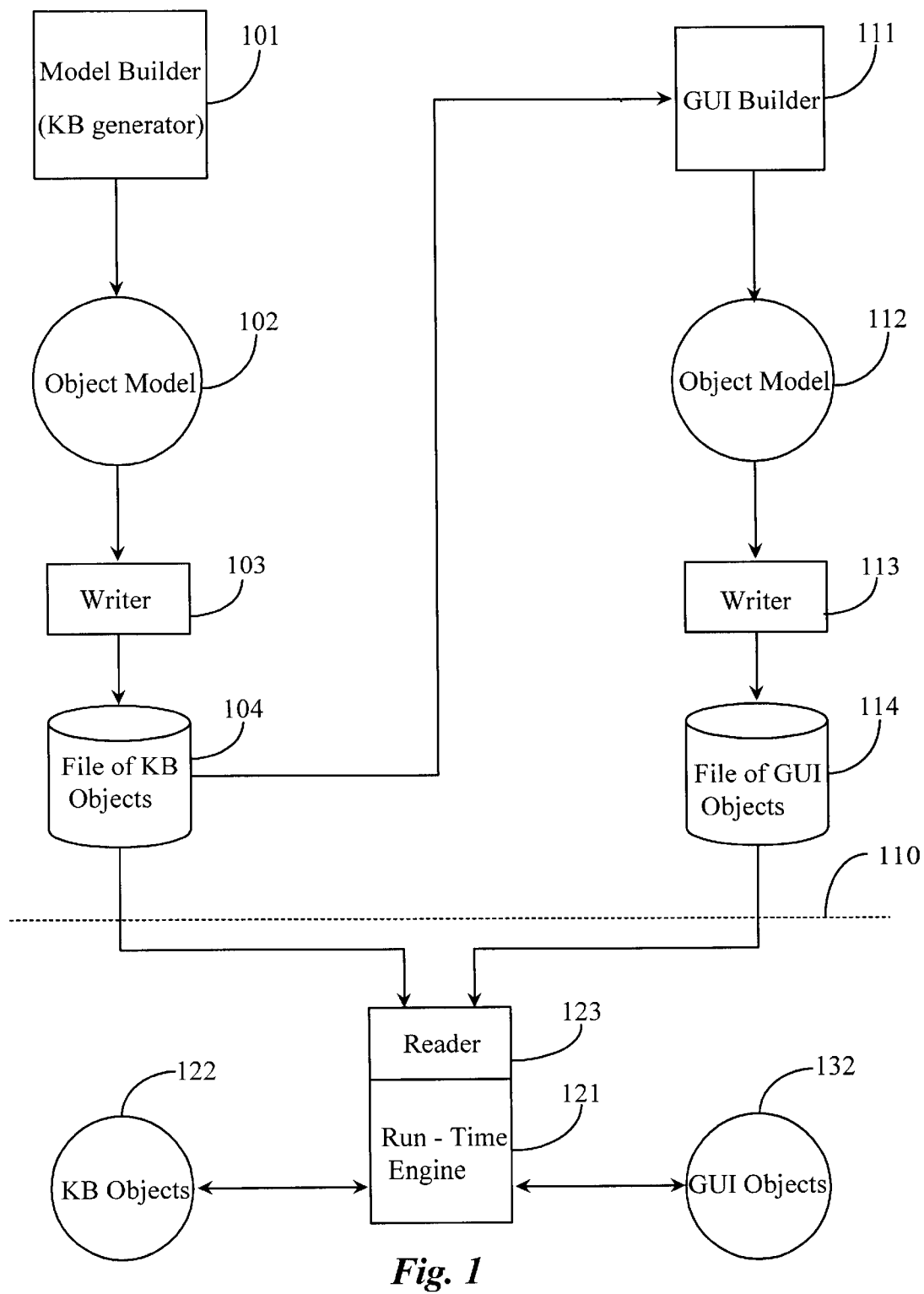
FIG. 1 is a flow chart illustrating a procedure for knowledge base merging and optimization according to an embodiment of the present invention.

FIG. 1 is a flow chart illustrating a knowledge base work flow application according to an embodiment of the present invention wherein both knowledge base objects and GUI objects are generated and presented to a client by an advertiser or seller of a product.

A knowledge base generator (KB generator) or model builder 101 is used at the seller's end to create a desired object model 102. As described briefly with reference to the background section, object model 102 contains all of the information related to the represented object or product such as dimensions, colors, styles, pricing and the like. Model builder 101 is a software tool known to the inventor in the art of generating knowledge bases.

In a preferred embodiment of the present invention a programming language such as Java or C+ is used in the building of object model 102. The reason for this is because these languages are relatively universal and usable among different platforms. It will be apparent to one with skill in the art that many different programming languages could be used in creating object model 102 without departing from the spirit and scope of the present invention such as Perl or Visual Basic. The languages mentioned above are used in a preferred embodiment for the reasons described.

A unique and innovative method according to an embodiment of the present invention is initiated by using a model-converting writer 103 to write object model 102 into the form of a collection of human-readable ASCII files. Such files are commonly referred to as flat files, and are typically human readable and sensical. A flat file 104 which is an ASCII file containing knowledge base objects that have been converted and written by model-converting writer 103 can be transported to the client over the Internet or another type of network. Flat file 104 is an external-media-type file that can be read by a computer program or by a person. Therefore the re-creation or modification of the object models can be automated or manual. Also, communications across different platforms is sometimes "intransparent", meaning only human readable files can be transferred. Other file types, such as binary files, can contain characters that would be interpreted by either entity (sending or receiving computer) as commands, including such commands that can disrupt or terminate such communications.

Flat file 104 in an embodiment of the invention is used as a source for a GUT builder 111 in the process of building a GUI object model 112. GUI-object model 112 insures that there are graphical or visual representations of the appropriate parts of object model 102. Using a conversion-model writer 113, GUI-object models are written into the form of human-readable ASCII flat files along with some optional multimedia files for filling in the GUI that can then be sent to a client.

The incorporation of a human readable, ASCII format into the knowledge base process allows for the transporting of the associated information across different computer platforms as well as allowing for the use of differing languages. This unique method utilizes known software applications such as model-converting writers 103, and 113 and enhances them with the capability of converting the object models into flat files as taught above.

In FIG. 1, dotted line 110 represents a network transmission interface, such as transmission of files to a client via an Internet connection. Those steps and processes appearing above line 110 are on the seller's side, and those below are on the client's side. Presumably, in the case of the Internet, the client has accessed the seller's Internet site, and is capable of downloading selected information. Whether or not the information downloaded is useful to the client is an issue addressed by the present invention.

At the client's end, a reader application 123 reads the flat files downloaded from the advertiser's site and rebuilds these files into objects for a knowledge-based configurator known in the art as a run-time engine 121. Run-time engine 121 converts flat files 104 and 114 back into knowledge base objects 122 and GUI objects 132 which are equivalent to object models 102 and 112. For example, if the same programming language and environment is used in run-time engine 121 as in model builder 101, then knowledge base 122 will be identical to object model 102 both binaurally and descriptively. The same relationship can be concluded with regards to GUI objects 132 and object model 112. If a different language and environment is used in run-time generator 121 that that used in model builder 101, then the files are not binaurally identical, but will accurately describe the same object.

A process of the present invention as described above may be used to up-date configurator systems such as run-time engine 121. Editing or changing rules may be done from within the knowledge base instead of from within the object model via the addition of a reader that reads the flat file back into object model 102.

It will be apparent to one with skill in the art that a method of the present invention such as described with reference to FIG. 1 could use a variety of different programming languages as known in the art without departing from the spirit and scope of the present invention. It will also be apparent to one with skill in the art that the method of the present invention may be adapted to be transported across a variety of known computer platforms without departing from the spirit and scope of the present invention. For example a client using a windows operating system may download and configure ASCII files that Were generated in a UNIX environment and so on.

Method for Merging Multiple Knowledge Bases into one Optimized Knowledge Base According to another aspect of the present invention a method and apparatus is provided for merging and optimizing two or more individual knowledge bases into one knowledge base that can be deployed over a wide area network (WAN) such as the Internet in the form of a single flat file. Referring again to FIG. 1, this process would be implemented on the seller's side before file transmission to a potential customer, that is, above line 110 in FIG. 1. A desirable goal, as described above in the background section, is to reduce the size of the file or files transmitted to the potential buyer, as such files are typically voluminous and bandwidth and storage space are always at a premium.

Figure 2:
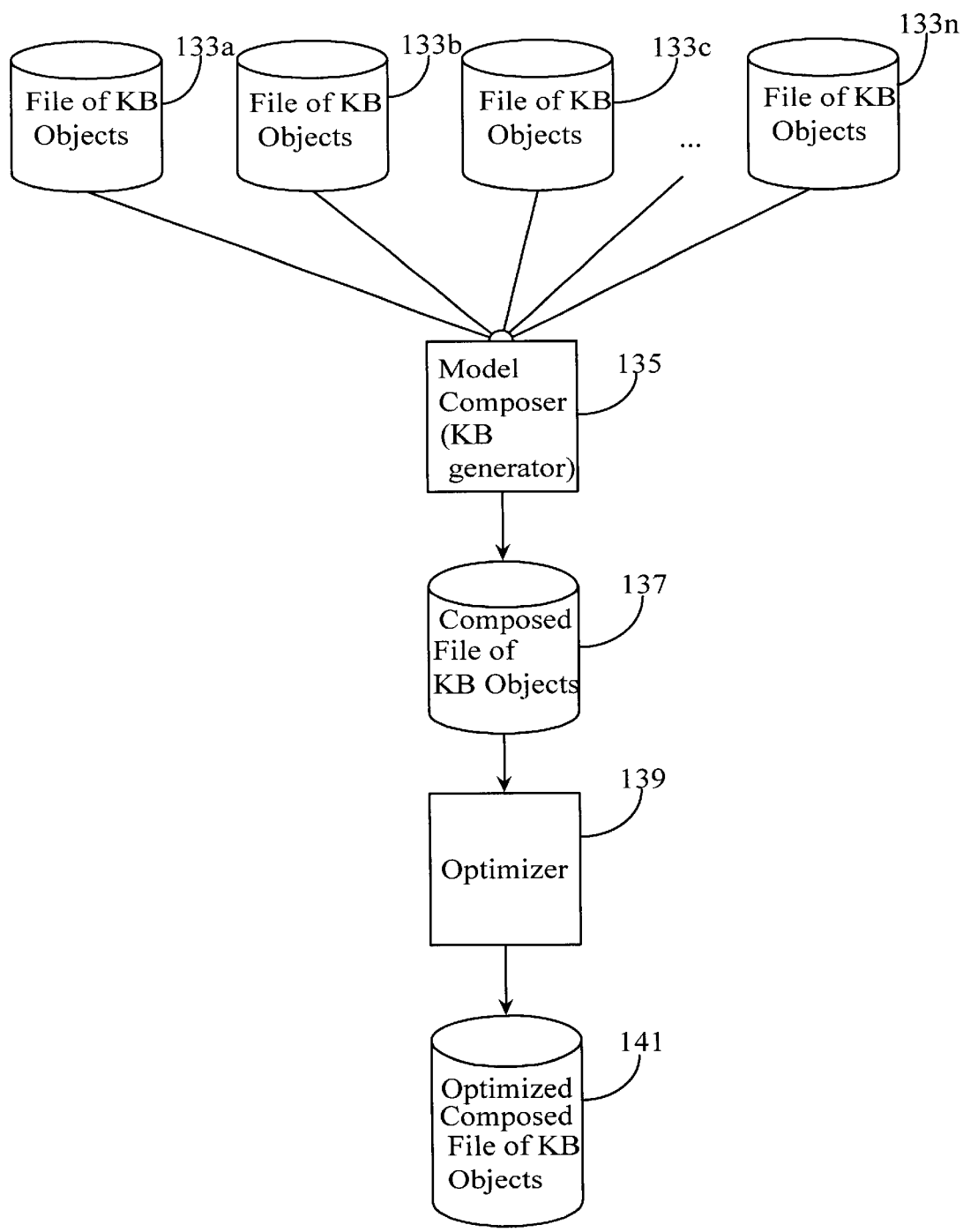
FIG. 2 is a flow chart illustrating an alternative knowledge base merging and optimization process according to an embodiment of the present invention.

FIG. 2 is a flow chart illustrating a merging and optimization process according to an embodiment of the present invention wherein two or more related knowledge bases are merged and optimized into one more compact knowledge base. Several flat files of knowledge base objects are represented by element numbers 133a through 133n in FIG. 2. Each of these ASCII files in this example contains all of the information related to an individual model of a basic type of product in this example, and the information covered in each file is typically closely related, in this case, from the product standpoint. The close relationship makes it logical to prepare such files as individual entities. Files 133a through 133n in this example share certain commonalties as well as exhibit certain differences in their content, as should be expected from the nature of the information.

In a situation wherein a seller wishes to provide information concerning the general product line to a prospective buyer, the buyer or customer may not have decided exactly which model he wants to buy, and certainly not the individual features (options) available within model designations. Instead of sending each file 133a through 133n to the potential buyer, the seller uses a model composer 135 to merge files 133a through 133n into one more compact file 137 containing all of the information available and represented by individual files 133a through 133n. This process is intended to aid the customer by allowing him or her to work with one file as opposed to several files when configuring a purchase or other request, and to aid the seller in reducing the quantity of data necessary to send to the customer. Model composer 135 is a software tool adapted to merge and organize separate knowledge base files by compiling all of the information present in the original files, and presenting it in a form of a new file. Files are in this instance are both human and machine readable.

In the process of merging and integrating individual files 133a–133n using software tool 135, certain specific merge processes are carried out that result in integrated file 137 being significantly more compact than the literal sum of all of the individual files. One of these processes is a parameter merge process, and another other is a constraint merge process. These processes are definitely not conventional compression technology, but unique processes described in further detail below. Conventional compression techniques may be applied after the unique merging processes, as is also shown below.

After the merge and integration processes of tool 135, file 137 may be still further compacted in a further process, called by the inventors optimization, wherein an optimizer tool 139 processes file 137 to produce a new file 141 more compact than file 137, and ready to transmit to a potential customer/buyer. The optimization process is described in detail below as well. To best describe and teach the features and operations of the present invention, two sample files have been prepared, and are presented herein, labeled modelA.kbs and modelB.kbs.

ModelA.kbs
<CxKB "Model A" date="Tue Dec 23 13:37:31 GMT 1997" version=1.01>
<CxFlexModel "Model A">
<CxParaGroup "Feature">
<CxEnum "Model" {"A"}[I] desc="" url="" extid="">
<CxEnum "Feature1" {"F1-1", "F1-2", "F1-3"}[I] desc="" url="" extid="">
<CxEnum "Feature2" {"F2-1", "F2-2", "F2-3"}[A] desc="" url="" extid="">
<CxEnum "Feature3" {"F3-1", "F3-2"}[ ] desc="" url="" extid="">
<CxEnum "Feature4" {"F4-1", "F4-2"}[I] desc="" url="" extid="">
</CxParaGroup "Feature">
<CxConsGroup "Activity">
<CxCondAct <CxMExp ?"Model"="A" name="SubExp1"> <CxMExp ?"Feature2"="F2-1" name="SubExp2"> Then Require[?"Feature3"] name="F3 when F2-1">
</CxConsGroup "Activity">
<CxConsGroup "Value">
<CxRule <CxMExp ?"Model"="A" name="SubExpLhs0">
  <CxMExp ?"Feature1"="F1-2" name="SubExpLhs1">
  Then <CxMExp ?"Feature2"="F2-1" name="SubExpRhs0"> name="F1-2=F2-1">
<CxRule <CxMExp ?"Model"="A" name="SubExpLhs0">
  <CxMExp ?"Feature1"="F1-2" name="SubExpLhs1">
  Then <CxExp ?"Feature4"="F4-1" name="SubExpRhs0"> name="F1-2=F4-1">
</CxConsGroup "Value">
</CxFlexModel "Model A">
</CxKB "Model A" main="Model A">
ModelB.kbs
<CxKB "ModelB" date="Tue Dec 23 13.22:40 GMT 1997" version=1.01>
<CxFlexModel "Model B">
<CxParaGroup "Feature">
<CxEnum "Model" {"B"}[I] desc="" url="" extid="">
<CxEnum "Feature1" {"F1-1", "F1-2", "F1-3", "F1-4"}[I] desc="" url=extid="">
<CxEnum "Feature2" {"F2-1", "F2-2", "F2-3"}[A] desc="" url="" extid="">
<CxEnum "Feature4" {"F4-1", "F4-2"}[ ] desc="" url="" extid="">
</CxParaGroup "Feature">

<CxConsGroup "Activity">
<CxCondAct <CxExp ?"Model"="B" name="SubExp0">
  <CxExp ?"Feature2"="F2-2" name="SubExp1"> Then
  Require[?"Feature4"] name="F4 when F2-2">
</CxConsGroup "Activity">
<CxConsGroup "Value">
<CxRule <CxExp ?"Model"="B" name="SubExpLhs0">
  <CxExp ?"Feature1"="F1-1" name="SubExpLhs1">
  Then <CxExp ?"Feature2"="F2-1" name=
  "SubExpRhs0"> name="F1-1=F2-2">
</CxConsGroup "Value">
</CxFlexModel "Model B">
</CxKB "ModelB" main="Model B">

FIG. 3A and FIG. 3B is a block diagram illustrating parameter merging and constraint merging steps initiated at the seller's end using model composer 135 of FIG. 2 according to an embodiment of the present invention using coded expressions taken from the sample files.

In a typical knowledge base, parameter names used are unique to each type of parameter associated with a product. Similarly, the merge process for parameters is specific to each type of parameter. For example, with regard to an enumeration type parameter, a post-merge parameter is a union of all common parameter enumerations that are defined in each model.

Block 143 demonstrates a parameter merge between files modelA.kbs and modelB.kbs. Inspection of the two original files will show that modelA.kbs has an enumeration parameter statement for "Feature1" having three values, while modelB.kbs has a similar enumeration parameter for "Feature1" having four values. In a combined file it is not necessary to restate both of these enumeration parameters, so the unique merge process of the present invention merges these into a single parameter statement, as shown.

The same merge process is applied to other parameter statements in the two files, such as the enumeration parameter statements for "Feature2", "Feature3" and "Feature4".

After all of the parameters are merged as described above, they are made to be required, optional, or conditional based on the existence of said parameters in the pre-merged files. For example, if the parameter was required in all of the pre-merged ASCII files then it is made to be required in the merged file. If a parameter was used as an option in all of the pre-merged files then it is made optional in the merged file. If a parameter was available in some of the pre-merged files, but not in all of them, then it is made conditional in the merged file. If a parameter is made conditional in the merged file then additional activity constraints are used to identify the parameter with the correct models. Parameter values are enabled as per model also.

After merging as taught above, additional constraint tables are added to enable identification of conditional parameters with associated models. Block 147 illustrates such a listed constraint table for a parameter associated with "Feature1". In this example, model names are in a column to the left, and associated value names are in a column to the right. In the merged knowledge base, a separate table is listed for each merged parameter that is made conditional. The merged file, before a final optimization process is presented below as composite.kbs. This is the result of the merge process carried out on the two sample files modelA.kbs and modelB.kbs.

Composite.kbs
<CxKB "composite" date="Fri Feb 06 11:28:15 GMT 1998" version=1.01 compCtr=999>
<CxDecl CxFlexModel "composite">
<CxFlexModel "composite">
<CxParaGroup "Feature">
<CxEnum "Model" {"A", "B"}[I] desc="" extid="">
<CxEnum "Feature1" {"F1-1", "F1-2", "F1-3", "F1-4"}[I] desc="" extid="">
<CxEnum "Feature2" {"F2-1", "F2-2", "F2-3"}[A] desc="" extid="">
<CxEnum "Feature3" {"F3-1", "F3-2"}[ ] desc="" extid="">
<CxEnum "Feature4" {"F4-1", "F4-2"}[A] desc="" extid="">
</CxParaGroup "Feature">
<CxConsGroup "Activity">
<CxCondAct <CxMExp ?"Model"="A" name="Model=A"> Then Active[?"Feature3"] name="A-Para">
<CxCondAct <CxMExp ?"Model"="A" name="SubExp1"> <CXMExp ?"Feature2"="F2-1" name="SubExp2"> Then Require[?"Feature3"] name="A-F3 when F2-1">
<CxCondAct <CxMExp ?"Model"="B" name="SubExp0"> <CxMExp ?"Feature2"="F2-2" name="SubExp1"> Then Require[?"Feature4"] name="B-F4 when F2-2">
</CxConsGroup "Activity">
<CxConsGroup "Value">
<CxRule <CxMExp ?"Model"="A" name="SubExpLhs0">
  <CxMExp ?"Feature1"="F1-2" name="SubExpLhs1">
  Then <CxMExp ?"Feature2"="F2-1" name="SubExpRhs0"> name="A-F1-2=F2-1">
<CxRule <CxMExp ?"Model"="A" name="SubExpLhs0">
  <CxMExp ?"Feature1"="F1-2" name="SubExpLhs1">
  Then <CxMExp ?"Feature4"="F4-1" name="SubExpRhs0"> name="A-F1-2=F4-1">
<CxRule <CxMExp ?"Model"="B" name="SubExpLhs0">
  <CxMExp ?"Feature1"="F1-1" name="SubExpLhs1">
  Then <CxMExp ?"Feature2"="F2-1" name="SubExpRhs0"> name="B-F1-1=F2-2">
<CxKeyTable[?"Model",?"Feature1"] name="Model_Feature1 Table">
["A", "F1-1"]
["A", "F1-2"]
["B", "F1-2"]
["B", "F1-3"]
["B", "F1-4"]
</CxKeyTable>
<CxKeyTable[?"Model ",?"Feature2"] name="Model_Feature2 Table">
["A", "F2-1"]
["A", "F2-2"]
["A", "F2-3"]
["B", "F2-1"]
["B", "F2-2"]
["B", "F2-3"]
</CxKeyTable>
<CxKeyTable[?"Model",?"Feature3"] name="Model_Feature3 Table">
["A", "F3-1"]
["A", "F3-2"]
</CxKeyTable>
<CxKeyTable[?"Model ",?"Feature4"] name="Model_Feature4 Table">
["A", "F4-1"]
["A", "F4-2"]
["B", "F4-1"]
["B", "F4-2"]
</CxKeyTable>
</CxConsGroup "Value">
</CxFlexModel "composite">

</CxKB "composite" main="composite">

FIG. 4 is a block diagram illustrating an optimization phase according to an embodiment of the present invention wherein unnecessary duplicate expression and parts of expressions are eliminated resulting in a still more compact file.

Block 149 illustrates an optimization process wherein two rule constraint statements in the merged file composite.kbs are combined into one rule constraint statement. Optimization is performed separately for each type of constraint in this embodiment. It should be apparent to those with skill in the art, however, that the optimization phase could be performed as a part of a single software tool that also performs the other steps taught above.

In the Optimization phase, for example, if there are two rule constraints having the same expression on the left (If) but different expressions on the right (Then) as shown within block 149 then they may be optimized to provide a single expression. The (If) portion of the rules with a common (If) portion need not be repeated. The (Then) portion is combined to include the requirement of each of the original statements. Activity constraints are optimized in the same fashion as described for rules, but not explicitly shown here.

After the optimization process is complete, a resulting optimized file 141 is ready to deploy over a WAN such as the Internet to a prospective client/buyer. In addition to a more compact file as a result of the merge and optimization processes, standard data compression techniques that are well known in the art may also be applied to further reduce the size of file 141. The conventional compression is not required, but is a preferred step to further reduce the size of the integrated file.

The merged, optimized file prepared a result of the unique illustrated processes of the present invention from original sample files modelA.kbs and ModelB.kbs is presented here: CompositeOptimized.kbs <CxKB "compositeoptimized" date="Fri Feb 06 11:28:31 GMT 1998" version=1.01 compCtr=999>
<CxDecl CxFlexModel "compositeoptimized">
<CxFlexModel "compositeoptimized">
<CxParaGroup "Feature">
<CxEnum "Model" {"A", "B"}[I] desc="" extid="">
<CxEnum "Feature1" {"F1-1", "F1-2", "F1-3", "F1-4"}[I] desc="" extid="">
<CxEnum "Feature2" {"F2-1", "F2-2", "F2-3"}[A] desc="" extid="">
<CxEnum "Feature2" {"F3-1", "F3-2"}[ ] desc="" extid="">
<CxEnum "Feature4" {"F4-1", "F4-2"}[A] desc="" extid="">
</CxParaGroup "Feature">
<CxConsGroup "Activity">
<CxCondAct <CxMExp ?"Model"="A" name="Model=A"> Then Active[?"Feature3"] name="A-Para"><CxCondAct <CxMExp ?"Model"="A" name="SubExp1"> <CxMExp ?"Feature2"="F2-1" name="SubExp2"> Then Require[?"Feature3"] name="A-F3 when F2-1">
<CxCondAct <CxMExp ?"Model"="B" name="SubExp0"> <CxMExp ?"Feature2"="F2-2" name="SubExp1"> Then Require[?"Feature4"] name="B-F4 when F2-2">
</CxConsGroup "Activity">
<CxConsGroup "Value">
<CxKeyTable[?"Model",?"Feature4"] name="Model_Feature4 Table">
["A", "F4-1"]
["A", "F4-2"]
["B", "F4-1"]
["B", "F4-2"]
</CxKeyTable>
<CxKeyTable[?"Model",?"Feature3"] name="Model$_{13}$ Feature3 Table">
["A", "F3-1"]
["A", "F3-2"]
</CxKeyTable>
<CxKeyTable[?"Model ",?"Feature2"] name="Model_Feature2 Table">
["A", "F2-1"]
["A", "F2-2"]
["A", "F2-3"]
["B", "F2-1"]
["B", "F2-2"]
["B", "F2-3"]
</CxKeyTable>
<CxKeyTable[?"Model",?"Feature1"] name="Model_Feature1 Table">
["A", "F1-1"]
["A", "F1-2"]
["A", "F1-3"]
["B", "F1-4"]
["B", "F1-2"]
["B", "F1-1"]
["B", "F1-4"]
</CxKeyTable>
<CxRule <CxMExp ?"Model"="A" name="SubExpLhs0">
  <CxMExp ?"Feature1"="F1-2" name="SubExpLhs1">
  Then <CxMExp ?"Feature2"="F2-1" name="SubExpRhs0"> <CxMExp ?"Feature4"="F4-1" name="SubExpRhs0"> name="A-F1-2=F2-1">
<CxRule <CxMExp ?"Model"="B" name="SubExpLhs0">
  <CxMExp ?"Feature1"="F1-1" name="SubExpLhs1">
  Then <CxMExp ?"Feature2"="F2-1" name="SubExpRhs0"> name="B-F1-1=F2-2">
</CxConsGroup "Value">
</CxFlexModel "compositeoptimized">
</CxKB "compositeoptimized" main="compositeoptimized">

It will be apparent to one with skill in the art that the enhancement and compaction that can be achieved through merging and optimization, as described above, will depend in part on the number of differing parameters present in the original files that must be optimized and constrained. Through empirical method, the inventor has found that in merging and optimizing several files representing separate models of a product, the size reduction achievable can be as much as 60% of the total of the original files, sometimes more. It will also be apparent to one with skill in the art that standard data compression techniques may reduce file size substantially further as described above.

It will be apparent to one with skill in the art that the merge and optimization techniques as described and taught herein may be applied to files (knowledge bases) pertaining to a wide variety of products and services without departing from the spirit and scope of the present invention such as industrial equipment, consumer items, real-estate presentations, automobiles, trucks, and so forth. It will also be apparent to one with skill in the art that further file size reduction can be obtained via known data compression standards that are generally available. The spirit and scope of the present invention is limited only by the claims that follow.

What is claimed is:

1. A method for integrating a first and a second knowledge base file, the two files each representing a unique characteristic of a particular abstract entity, into a single smaller integrated third file, comprising steps of:

(a) loading at least portions of the two files to a software integrating engine;

(b) merging all instances of each unique parameter in the loaded portions of the first and second files into a single composite parameter in the integrated third file; and (c) adding constraints to each single composite parameter in the third file, indicating which unique characteristic designates each value.

2. The method of claim 1 further comprising a step (d) merging all common value and activity constraints from the loaded portions of the first and second files into a single constraint by forming a single constraint with the common left-side term and creating a new right-side term from the multiple right-side terms for each common left-side term.

3. The method of claim 1 wherein the first and second files are loaded and integrated in their entirety.

4. The method of claim 3 wherein any number of files are loaded and integrated.

5. A method for integrating multiple knowledge base files, each file representing a unique characteristic of a particular abstract entity, providing a single integrated file of smaller size than the size sum of the original multiple files, the method comprising steps of:

(a) merging all instances of each unique parameter in the multiple files into a single composite parameter in the single integrated file;

(b) adding constraints to the single composite parameter, indicating which entry characteristic designates each value; and (c) merging all common value and activity constraints from the multiple files into a single value or activity constraint by forming a single constraint with the common left-side term and creating a new right-side term from the multiple right-side terms for each common left-side term.

6. The method of claim 5 comprising an additional step (d) for compressing the resulting single integrated file by conventional compression techniques.

7. The method of claim 5 wherein the multiple files represent different models of a single product.

8. The method of claim 7 wherein the product is any product configured from logical or physical parts.

9. A software engine for integrating a first and a second knowledge base file, wherein each of the first and second files represent knowledge of different aspects of a common entity, into a single smaller integrated third file, comprising;

(a) an acquisition module for loading at least portions of the two files;

(b) a parameter merge module adapted for merging all instances of each unique parameter in the loaded portions of the first and second files into a single composite parameter in the integrated third file; and a constraint differentiation module adapted for adding constraints to the single composite parameter, indicating which aspect of the common entity designates each value.

10. The software engine of claim 9 further comprising an optimization module adapted for merging all common value and activity constraints from the first and second files into a single value or activity constraint by forming a single constraint with the common left-side term and creating a new right-side term from the multiple right-side terms for each common left-side term.

11. A software engine for integrating multiple knowledge base files, each file representing a unique entry characteristic, providing a single integrated file of smaller size than the size sum of the original multiple files, comprising:

a parameter merge module adapted for merging all instances of each unique parameter in the multiple files into a single composite parameter in the single integrated file, designating each of the values of the separate unique parameters;

a constraint differentiation module adapted for adding constraints to the single composite parameter, indicating which entry characteristic designates each value; and an optimization module adapted for merging all common value and activity constraints from the multiple files into a single value or activity constraint by forming a single constraint with the common left-side term and creating a new right-side term from the multiple right-side terms for each common left-side term.

12. The software engine of claim 11 additionally comprising a compression module for applying compression techniques to a file resulting from application of the parameter merge module, the constraint differentiation module, and the optimization module.

* * * * *